Oct. 4, 1966  A. T. PHELPS  3,276,682
COMPUTER FOR AIR NAVIGATION
Filed Sept. 1, 1965  2 Sheets-Sheet 1
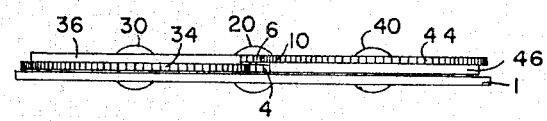
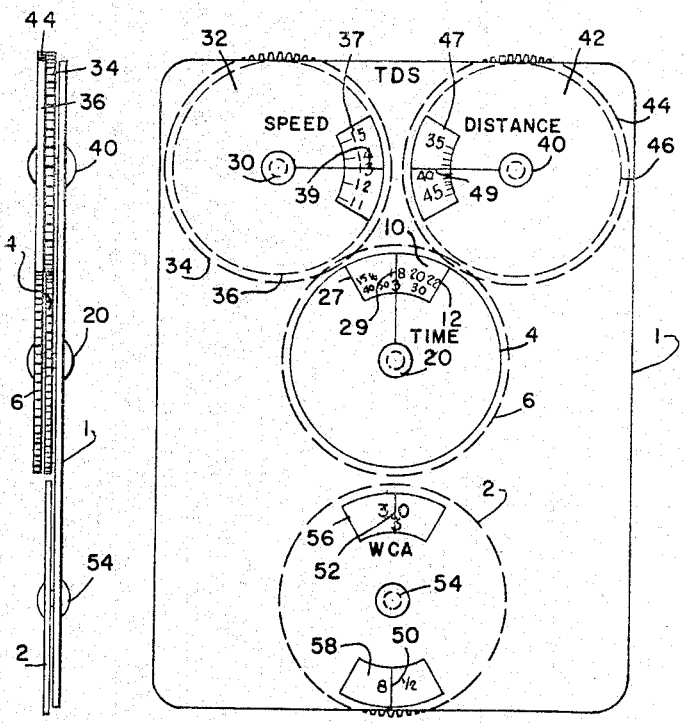
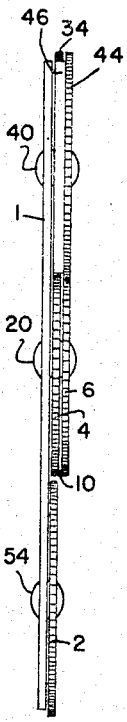
INVENTOR.
ALFRED T. PHELPS
BY Semmes & Semmes
ATTORNEYS

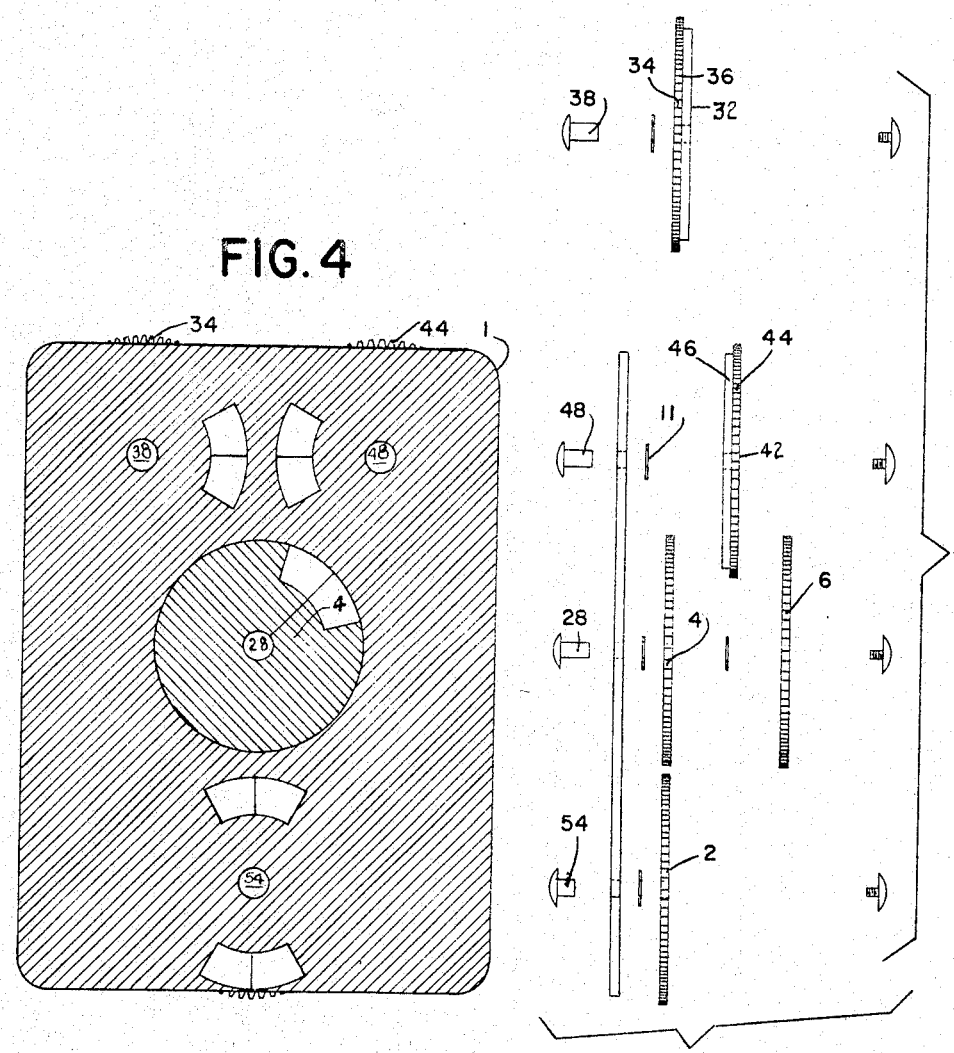

United States Patent Office 3,276,682
Patented Oct. 4, 1966

3,276,682
COMPUTER FOR AIR NAVIGATION
Alfred T. Phelps, 1017 Hilda Ave., Missoula, Mont.
Filed Sept. 1, 1965, Ser. No. 484,168
6 Claims. (Cl. 235—61)

This invention is concerned with a new and novel computer for air navigation, in which time, distance, speed and wind correction factors can be readily calculated. It is, more specifically, directed to a mechanical arrangement in which the navigator or pilot can easily manipulate the appropriate dials, and quickly read and determine the desired readings.

Although computers for air navigation purposes are currently used to determine time, distance and speed values, as well as to provide for wind correction factors, these computers are complex and difficult to manipulate. As a consequence, many pilots do not file flight plans. This defeats search and rescue operations when they become necessary.

It is therefore an object of my invention to provide a computer for air navigation which is simple, self explanatory, and applicable for general navigational use.

It is another object of my invention to provide a computer which fits upright in a shirt pocket, and which is sensitive to finger tip control.

It is another object of my invention to provide a computer fitted with translucent indicator dials or scales so that light shining on the figures may appear for night flying.

It is another object of my invention to provide a computer for easily calculating time, distance and speed measurements, and for quickly determining wind correction factors.

These and other advantages of my invention will be obvious from the following specification and drawings in which:

FIGURE 1 is a top plan view of the computer and its housing, illustrating the interrelationship of the various gears;

FIGURE 2 is a rear elevation view of FIGURE 1;

FIGURE 3 is a right side elevation view of the computer as drawn in FIGURE 1;

FIGURE 4 is a top plan view of the computer and its housing which illustrates the various opaque areas;

FIGURE 5 is a fragmentary view of the various parts of the computer and its housing which illustrates how the various parts interact and fit together;

FIGURE 6 is a left side elevation view of the computer as drawn in FIGURE 1.

In FIGURE 1, the general layout of the gears and their interrelationship is illustrated. My invention comprises five gears fastened to face plate 1 as illustrated in FIGURE 1. Four of the five gears are used for time, distance and speed parameters, said four gears being mounted on three parallel axis 20, 30 and 40. Axis 30 is the speed axis; axis 40 is the distance axis; and axis 20 is the time axis. There are two gears, 4 and 6, mounted on axis 20 as more clearly illustrated in FIGURE 3. Gears 4 and 6 are identical and are made of plastic, with a paper or plastic scale, in the same circular shape as the gears, being inserted between said gears 4 and 6. Scale 10 is graduated in hours and minutes, and shows through the translucent area of gear 4.

Gears 32 and 42, respectively mounted on axis 30 and 40, are identical, but are reversed relative to placement on face plate 1. This is more clearly illustrated in FIGURE 2 which shows that gears 32 and 42 include two circular sections, one section of which is larger in diameter than the other, said larger section having teeth around its outer periphery (note sections 34 and 44 respectively).

As illustrated in FIGURE 2, the tooth like circular section 34 of gear 32 is mounted directly next to the face plate 1. However, as also illustrated in FIGURE 2, the smaller diameter, smooth circular portion 46 of gear 42 is mounted immediately next to face plate 1. The purpose of this is to provide an interaction of the gears which will allow calculation of either the speed, distance or time parameter, when two of the other of the three parameters, when two of the other of the three parameters are known.

FIGURE 3 illustrates the interaction of teeth on gears 6 and 42 respectively, and more particularly illustrates the interaction of the teeth on gear 6 with the teeth on section 44 of gear 42. Rotation of the distance gear 42 by the fingertip will rotate the time scale located on the gear 6.

FIGURE 6 illustrates the interaction of gear 4 with gear 32, and more particularly the interaction of the teeth of gear 4 with the teeth on section 34 of gear 32. Rotation of the speed gear 32 will thus cause rotation of the time gear 4. This will result in rotation of the translucent area located on time gear 4, thereby causing a change in its position and that of indicator line 29 relative to the time scale.

FIGURE 5 illustrates the manner in which the particular gears are mounted on face plate 1. Gear 2 is mounted on the face plate by fastener 54; gears 4 and 6 are mounted on the face plate by fastener 28; gear 42 is mounted on the face plate by fastener 48; and gear 32 is mounted on the face plate by fastener 38. Washers 11 are inserted between the various parts of the combination as indicated, to provide easy turning of the gears.

Face plate 1 is in the form of a plastic rectangle with rounded corners as indicated in FIGURE 1. The face plate is opaque except in certain areas where windows are provided for the purpose of reading the various scales. This is more clearly illustrated in FIGURE 4, in which the cross hatched area illustrates the dark part of the face plate, and wherein the white areas indicate the window areas.

Thus, as illustrated in FIGURE 1, window 37 enables reading of the speed scale; window 47 enables reading of the distance scale; and windows 56 and 58 enable reading of the wind correction scales. Indicator lines 39 and 49 indicate the setting of the speed and distance scales, respectively. Indicator line 52 indicates the setting of the angle of attack and wind correction angle, and indicator line 50 indicates the setting of the help or hindrance speed of the wind. The above indicator lines 39, 49, 50 and 52 are thin opaque lines in the face plate.

The area of the face plate directly above the time gear 4 is translucent, but the time gear is opaque as illustrated in FIGURE 4. The time gear does define window 27 as a translucent area, however, so that scale 10 may be read. Indicator line 29 is a thin opaque line located within this window area on time gear 4.

The various scales mentioned are partially illustrated in FIGURE 1. The speed scale is either mounted or etched onto the top surface of gear 32 and is logarithmically graduated from 10 to 100 in the counter clockwise direction. A section of the scale is illustrated in FIGURE 1.

The distance scale is mounted or etched onto the top surface of gear 42 and comprises a similar logarithmic scale graduated from 10 to 100 in the counter clockwise direction as described in reference to the speed scale. A section of this scale is illustrated in FIGURE 1.

The time scales, identified by element 10 in FIGURES 1, 2 and 3, can comprise either a cardboard or plastic mount between gears 4 and 6 or, alternatively, may be directly etched or painted on the top surface of gear 6. It is logarithmically graduated in hours on an inner scale, and in minutes on an outer scale, which is similar to the speed and distance scales, but extends from 10 to 100 in the clockwise direction. The inner time scale graduation 1, corresponding to 1 hour and powers of 10 multiples thereof, corresponds to the 60 graduation of the outer scale; the 1 hour 30 minute graduation on the inner time scale corresponds to the 90 graduation of the outer scale; the 3 hour graduation on the inner time scale corresponds to the 18 graduation of the outer scale as illustrated in FIGURE 1. The mathematical relationship between 2 hours and 10 hours on the inner time and outer scale is Inner time scale reading=

$$\frac{\text{Outer scale reading}}{6}$$

The wind correction scale is mounted on gear 2. As indicated in FIGURES 1, 3 and 6, the fundamental basis of the scale was established by triangulation using a wind velocity of 10, aircraft speeds of 100 m.p.h., and 90° for the direction of the wind relative to the direction of the plane. Under this basis, any change of the wind velocity is directly proportional to the wind correction angle, as illustrated by the following Examples A–D:

(A)

Air speed—100 knots
Wind velocity—20 knots
Wind attack angle—30°
Wind correction angle—3°

The wind correction angle would be directly proportional to the wind velocity. The wind speed being twice that of 10 would be 2×3=6 degrees (B)

Airspeed—200 knots
Wind velocity—10 knots
Wind attack angle—30°
Wind correction angle—3°

The aircraft speed being twice that of 100, the wind correction angle would be indirectly proportional to the wind correction angle ½ of 3=1½ degrees (C)

Airspeed—100 knots
Wind velocity—5 knots
Wind attack angle—30°
Wind correction angle—3°

The wind correction angle is directly proportional to the wind speed which would be ½ of 3=1½ degrees Also on the dial is shown the wind speed help or hindrance to the speed of the aircraft. Mentally, this can be easily computed by multiplying the wind speed in tenths over the basic 10 as illustrated in the following example.

(D)

Wind—16 knots
Airspeed—170 knots
Aid by the wind—8½ knots

The wind being 6/10 knot greater than the 10 knots, the ground speed can then be computed multiplying .6×8½=5.1. This added to 8½=13.6 which is the help or hindrance to the ground speed of the aircraft.

The following table gives the corresponding settings for the three indications—Wind Angle Attack, Wind Correction Angle, and Speed: Help or Hindrance—provided by the wind correction scale, as illustrated in FIGURE 1.

| Wind Angle Attack | Wind Correction Angle | Speed: Help or Hindrance |
|---|---|---|
| 10° | 1° | 10 |
| 20° | 2° | 9 |
| 30° | 3° | 8½ |
| 40° | 4° | 8 |
| 50° | 5° | 6¼ |
| 60° | 5½° | 5½ |
| 70° | 6° | 3 |
| 80° | 6¼° | 1¼ |
| 90° | 6¼° | −½ |

FIGURE 1 illustrates a specific example, in which the desired speed is 130 m.p.h. Therefore, the speed gear is rotated to the 13 setting under indicator line 39. Assuming that the distance desired to be travelled is 390 miles, the distance gear is rotated to the 39 setting under indicator line 49. The outer figure under the indicator line 29 of the time scale indicates 18, the number of minutes it will take to go 39 miles at 130 miles per hour. The larger figure under 18, that is, 3, indicates the time in hours it would take to go 390 miles at 130 miles per hour. The smaller figures around the hour scale are parts of an hour in minutes.

Assuming the heading of the aircraft is 90°, the wind blowing from 240° at 10 m.p.h., the angle of attack of the wind would be 30°. Therefore, by rotating the wind correction angle scale to 30 (top row of figures), we find the number 3 directly below it (see FIGURE 1). This is the wind correction angle in degrees. The figure at the bottom shows 8½ which is the speed in miles per hour which will help or hinder the speed of the aircraft depending upon the direction of the aircraft. Therefore, the speed of the aircraft at 100 miles per hour will increase to 108½ m.p.h. or be retarded to 91½ m.p.h. with a wind correction angle of 3°.

Wind correction and aircraft speeds are not constant so on the basis of ten we interpolate. Winds of 20 would be twice that of 10, thus the increase of speed to the aircraft would be twice 8½ or 17, the wind correction angle twice that of 3 would be 6°. For speeds of aircraft greater than 100, a similar interpolation would be made, for example, an aircraft speed of 200 would have ½ of the wind correction angle for the above wind speeds and direction, or ½ of 3=1½°.

Having thus described my invention, I claim the following:

1. A computer for air navigation which comprises:
    (A) a face plate;
    (B) four gears mounted on said face plate, the first of said gears being mounted on an axis corresponding to speed, the second of said gears being mounted on an axis corresponding to distance, and the remaining third and fourth of said gears being mounted on an axis corresponding to time, said three axes being parallel;
    (C) one of said two gears on said time axis being in interrelationship with said gear on said speed axis, the other of said gears on said time axes being in interacting relationship with said gear on said distance axis;
    (D) a logarithmic scale graduated in miles per hour located on said first gear;
    (E) a logarithmic scale graduated in miles located on said second gear;
    (F) a logarithmic scale graduated in hours and minutes located between said third and fourth gears whereby speed, distance or time calculations can be easily made by manipulating said gears;
    (G) a fifth gear mounted on said face plate; a scale located on said fifth gear whereby the wind correction angle and help or hinderance speed corresponding to different angles of attack may be easily indicated, said gear being rotatable around a fourth axis mounted in parallel relationship with said three axes; and wherein said face plate comprises an opaque plastic material wherein translucent window areas with opaque indicator lines are provided to enable reading of the speed, distance, time, and wind correction scales.

2. The computer for air navigation as described in claim 1 wherein said gear on said time axis which is in interacting relationship with said gear on said speed axis is opaque except for a translucent window area with an opaque indicator line, to enable easy reading of the time scale.

3. A computer for air navigation which comprises:
(A) a face plate;
(B) four gears mounted on said face plate, the first of said gears being mounted on an axis corresponding to speed, the second of said gears being mounted on an axis corresponding to distance, and the remaining third and fourth of said gears being mounted on an axis corresponding to time, said three axes being parallel;
(C) one of said two gears on said time axis being in interrelationship with said gear on said speed axis, the other of said gears on said time axis being in interacting relationship with said gear on said distance axis;
(D) a speed scale located on said first gear; a distance scale located on said second gear; and a time scale located between said third and fourth gears;
(E) said face plate comprising an opaque material wherein translucent window areas with opaque indicator lines are provided to enable reading of the speed, distance, and time scales.

4. The computer for air navigation as described in claim 3, wherein said gear on said time axis which is in interacting relationship with said gear on said speed axis is opaque except for a translucent window area with an opaque indicator line to enable easy reading of the time scale.

5. A computer for air navigation which comprises:
(A) a face plate;
(B) five gears fastened to said face plate, four of said gears being used for time, distance and speed parameters, said four gears being mounted on three parallel axes, one each corresponding to time, distance, and speed, with two of said four gears being mounted on said time axis;
(C) a speed scale located on said first gear; a distance scale located on said second gear; and a time scale located between said third and fourth gears;
(D) one of said two gears on the time axis being in interacting relationship with said gear on said speed axis;
(E) the other of said gear on said time axis being in interacting relationship with said gear on said distance axis, whereby speed, distance, or time calculations can be easily made if two of the other of said three parameters are known;
(F) a fifth gear being fastened to said face plate and marked to indicate the help or hinderance speed of the wind and the wind correction angle, said face plate comprising an opaque material wherein translucent window areas with opaque indicator lines are provided to enable reading of speed, distance, time, and wind correction scales.

6. The computer for air navigation as described in claim 5, wherein said gear on said time axis which is in interacting relationship with said gear on said speed axis is opaque except for a translucent window area with an opaque indicator line, to enable easy reading of the time scale.

References Cited by the Examiner

UNITED STATES PATENTS

| | | | |
|---|---|---|---|
| 2,732,128 | 1/1956 | Gurney et al. | 235—61 |
| 2,775,404 | 12/1956 | Lahr | 235—61 |
| 2,901,167 | 8/1959 | Mudge | 235—61 |
| 2,972,813 | 2/1961 | Stinton | 235—61 |
| 3,131,859 | 5/1964 | Nilsson | 235—61 |

RICHARD B. WILKINSON, *Primary Examiner.*

W. F. BAUER, *Assistant Examiner.*